(12) United States Patent
Kenney et al.

(10) Patent No.: US 8,484,589 B2
(45) Date of Patent: Jul. 9, 2013

(54) LOGICAL REPARTITIONING IN DESIGN COMPILER

(75) Inventors: Robert D. Kenney, Austin, TX (US); Hani Hasan Mustafa Saleh, Austin, TX (US); Sreevathsa Ramachandra, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/283,665

(22) Filed: Oct. 28, 2011

(65) Prior Publication Data
US 2013/0111424 A1    May 2, 2013

(51) Int. Cl.
*G06F 17/50* (2006.01)

(52) U.S. Cl.
USPC ........... 716/105; 716/100; 716/103; 716/104; 716/106; 716/108

(58) Field of Classification Search
USPC .......................... 716/100, 103, 104, 105, 108
See application file for complete search history.

(56) References Cited

U.S. PATENT DOCUMENTS

| | | | | |
|---|---|---|---|---|
| 5,912,819 | A * | 6/1999 | Kucukcakar et al. ......... | 716/102 |
| 6,167,363 | A * | 12/2000 | Stapleton ........................ | 703/14 |
| 6,170,080 | B1 * | 1/2001 | Ginetti et al. ................. | 716/104 |
| 6,292,931 | B1 | 9/2001 | Dupenloup | |
| 6,336,087 | B2 | 1/2002 | Burgun et al. | |
| 6,339,836 | B1 * | 1/2002 | Eisenhofer et al. ........... | 716/106 |
| 6,453,449 | B1 * | 9/2002 | Wada ........................... | 716/107 |
| 6,536,028 | B1 * | 3/2003 | Katsioulas et al. ........... | 716/125 |
| 6,651,235 | B2 * | 11/2003 | Dai et al. ........................ | 716/55 |
| 6,668,364 | B2 * | 12/2003 | McElvain et al. ............. | 716/103 |
| 6,836,877 | B1 * | 12/2004 | Dupenloup ................... | 716/103 |
| 6,895,562 | B2 * | 5/2005 | Rohrbaugh et al. .......... | 716/103 |
| 7,117,458 | B1 * | 10/2006 | Hurlock ........................ | 716/103 |
| 7,328,421 | B1 * | 2/2008 | Ballagh et al. ................ | 716/103 |
| 7,409,658 | B2 * | 8/2008 | Shang .......................... | 716/119 |
| 7,441,210 | B2 | 10/2008 | Lahner et al. | |
| 7,483,825 | B2 * | 1/2009 | Van Huben et al. ............ | 703/16 |
| 7,568,176 | B2 * | 7/2009 | Jatkowski et al. ............. | 716/125 |
| 7,647,575 | B2 * | 1/2010 | Koga et al. .................... | 716/104 |
| 7,805,697 | B2 * | 9/2010 | Wood ........................... | 716/113 |
| 7,966,598 | B2 * | 6/2011 | Polomik et al. ............... | 716/130 |
| 8,141,010 | B1 * | 3/2012 | Kong et al. ................... | 716/100 |

(Continued)

OTHER PUBLICATIONS

U.S. Appl. No. 13/282,917 entitled "Tool Suite for RTL-Level Reconfiguration and Repartitioning" filed Oct. 27, 2011.

*Primary Examiner* — Helen Rossoshek
(74) *Attorney, Agent, or Firm* — Anthony M. Petro; Meyertons, Hood, Kivlin, Kowert & Goetzel, P.C.

(57) ABSTRACT

During a pop phase of hierarchical repartitioning of an IC design, all cells within a current hierarchy may be identified, the list of cells may be ungrouped to dissolve the current hierarchy, one or more specified cells may be removed from the list of cells, where the specified one or more cells are to be moved to a different hierarchy, and the new list of cells without the specified one or more cells may be re-grouped, to re-form the previously dissolved hierarchy. During a push phase of the hierarchical repartitioning, all cells within the next lower-level hierarchy may be identified, the identified list of cells may be ungrouped to dissolve that hierarchy, the specified one or more cells may be added to the identified list of cells, and the new list of cells that includes the specified one or more cells may be grouped to reform the previously dissolved hierarchy.

20 Claims, 7 Drawing Sheets

U.S. PATENT DOCUMENTS

| | | | |
|---|---|---|---|
| 8,302,056 B2 * | 10/2012 | Gaugler et al. | 716/119 |
| 2003/0101331 A1 | 5/2003 | Boylan | |
| 2003/0195736 A1 * | 10/2003 | Ghosh et al. | 703/14 |
| 2005/0268258 A1 * | 12/2005 | Decker | 716/4 |
| 2005/0268268 A1 * | 12/2005 | Wang et al. | 716/9 |
| 2005/0268269 A1 * | 12/2005 | Coiley | 716/11 |
| 2006/0117274 A1 | 6/2006 | Tseng et al. | |
| 2006/0225015 A1 | 10/2006 | Synek | |
| 2009/0031278 A1 * | 1/2009 | McElvain et al. | 716/18 |
| 2010/0218146 A1 * | 8/2010 | Platzker et al. | 716/4 |
| 2010/0251201 A1 | 9/2010 | Chin | |
| 2011/0035712 A1 * | 2/2011 | Gaugler et al. | 716/105 |
| 2011/0113392 A1 | 5/2011 | Chakraborty et al. | |
| 2012/0192132 A1 * | 7/2012 | Kenney et al. | 716/105 |

* cited by examiner

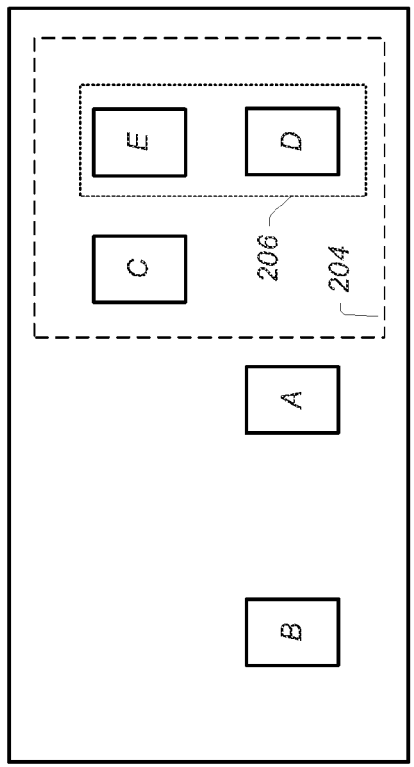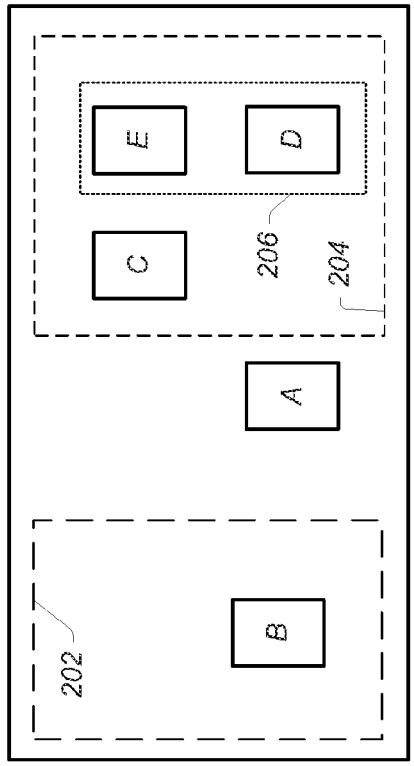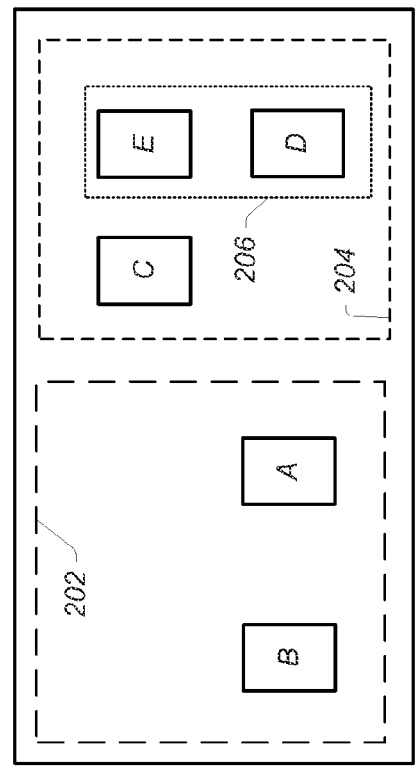

```
set start_instance top/a/b/c/d
set destination     top/a/e compare paths to set:
$NUM_LEVELS_UP
#   $NUM_LEVELS_DOWN
#   $down_designs($NUM_LEVELS_DOWN-1:0)

set start_list [split $start_instance {/}]
set dest_list  [split $destination    {/}]

# find number of common levels of hierarchy from top between the two paths
set num_common 0
set equal 1
while {$equal} {
    set s_term [lindex $start_list $num_common]
    set d_term [lindex $dest_list $num_common]
    if {$s_term == $d_term} {
        set equal 1
        incr num_common
    } else {
        set equal 0
    }
} set iteration variables
set NUM_LEVELS_UP   [expr [llength $start_list] - $num_common - 1] ; # last term in list is cell to move
set NUM_LEVELS_DOWN [expr [llength $dest_list ] - $num_common]
set down_designs ""
for {set i $num_common} {$i < [llength $dest_list]} {incr i} {
    lappend down_designs [lindex $dest_list $i]
} regsub {.*/} $start_instance {} cell_to_move
regsub {/\w+$} $start_instance {} cell_to_ungroup
```

FIG. 10a

```
# Pop block up hierarchy
for {set i 0} {$i<$NUM_LEVELS_UP} {incr i} {
    set cells_in_myhier [get_cells $cell_to_ungroup]
    set new_cells_in_myhier [remove_from_collection $cells_in_myhier [get_cell $cell_to_ungroup}/$cell_to_move}]]
    set curr_design [get_attr [get_cells $cell_to_ungroup] ref_name]
    sizeof_collection $cells_in_myhier
    sizeof_collection $new_cells_in_myhier
    ungroup $cell_to_ungroup -simple_names
    regsub {.*/} $cell_to_ungroup {} ungrouped_cell_name
    group $new_cells_in_myhier -design_name ${curr_design}_mod -cell_name $ungrouped_cell_name
    regsub {/\w+$} $cell_to_ungroup {} cell_to_ungroup ; # move scope up one level
}

# Push block down hierarchy
for {set i 0} {$i<$NUM_LEVELS_DOWN} {incr i} {
    set curr_hier $cell_to_ungroup
    append cell_to_ungroup "/[lindex $down_designs $i]" ; # set next level to push
    set curr_cells_in_myhier [get_cells $cell_to_ungroup/*]
    set new_cells_in_myhier [add_to_collection $curr_cells_in_myhier [get_cell ${curr_hier}/$cell_to_move}]]
    set curr_design [get_attr [get_cells $cell_to_ungroup] ref_name]
    ungroup $cell_to_ungroup -simple_names
    set ungrouped_cell_name [lindex $down_designs $i]
    group $new_cells_in_myhier -design_name ${curr_design}_mod -cell_name $ungrouped_cell_name
}
```

FIG. 10b

LOGICAL REPARTITIONING IN DESIGN COMPILER

BACKGROUND

1. Technical Field

This disclosure relates to integrated circuit design, and more particularly to a method for manipulating and repartitioning a hierarchical design.

2. Description of the Related Art

Integrated circuit design flow is a complex process. Most often, a functional/behavioral description of the system/circuit is created with use of a register transfer language (RTL) or hardware description language (HDL) such as Verilog or VHDL (Very high speed integrated circuits Hardware Description Language). An important part of the design process is the creation of a logic implementation, and subsequently a transistor level implementation of these behavioral models. The creation of these implementations is oftentimes automated through the use of "synthesis" tools. Generally, a synthesis program is used to generate a netlist from the HDL models, making use of standard cell libraries containing a variety of circuit elements from which the integrated circuit may be constructed. Netlists usually include instances of the standard cells contained in the design, with the possible inclusion of custom blocks, and information descriptive of the connectivity between all the instances included in the integrated circuit. There are different types of netlists that can be used, including physical and logical netlists, instance-based and net-based netlists, and flat and hierarchical netlists. Typically, the final netlist generated by the synthesis tool is dependent on the constructs that appear in the HDL model. In other words, the style and syntax of various functional elements in the HDL oftentimes determines the type of elements and components that appear in the netlist generated by the synthesis tool.

Because the design cycle for integrated circuits is complex and there are many steps, integrated circuits may oftentimes include circuit blocks that are exchanged between designers and design engineers as completed blocks. Part of this process includes one group of engineers, e.g. working for Intellectual Property (IP) vendors, delivering RTL code representative of a given design to another group of engineers. The RTL code can include various different logic/circuit blocks residing at different levels of hierarchy. Oftentimes, such third party IP may not be partitioned in a way that is ideal for physical implementation. In such cases, the RTL design hierarchy needs to be manipulated and/or repartitioned for better physical partitioning, in which case the various wrappers representing hierarchical partitions around the completed circuit blocks may also need to be modified. In order to achieve this, the RTL is typically recoded by hand, which is a very labor-intensive operation that needs to be performed every time a major code revision is received. In addition, the coding may need to be modified, as physical partitioning is refined. The existing electronic design automation tools such as design/synthesis tools do not perform repartitioning very well, particularly in a hierarchical design, in which various circuit blocks reside at different levels of hierarchy.

SUMMARY OF THE INVENTION

A circuit block—which may have been obtained from a previous design—represented in a hardware description language (HDL), or register transfer language (RTL) may include wrappers or boundary logic representing various levels of circuit hierarchy around one or more preexisting logic blocks that reside at the different levels of hierarchy. Design Compiler (DC), which is a part of the Synthesis program/process, has two built in commands that perform low-level wiring work. The first is an ungroup command used to dissolve a specified level of hierarchy. The second is a group command used to create a new level of hierarchy for a given set of cells, or logic/circuit blocks. These commands may be leveraged to manipulate the design hierarchy without modifying the source RTL.

In one set of embodiments, it may be desirable to select/specify various preexisting circuit/logic blocks presently residing at different levels of hierarchy within a specific design (represented in RTL code, for example) to be grouped together within a specified same level of hierarchy. A novel design flow may use multiple group/ungroup calls to move any cell or logic/circuit block to an arbitrary, i.e. freely selected place in the overall hierarchy, regardless of hierarchical distance between the cells (note: hereinafter, the word 'cell' is used to refer to any logic/circuit block, or any identified circuit/logic entity, which may be a cell, selected within a design as representing a specified operating unit or entity considered a building block, for example in a nested design). A series of ungroup and group commands may be used to first pop the cell(s) to a common point in the hierarchy, i.e. to a same level of hierarchy. Then, another series of ungroup and group commands may be used to push the cell(s) down to the final destination, i.e. to the desired level of hierarchy.

In one set of embodiments, a pop phase during hierarchical repartitioning may include multiple pop operations, during which all cells within a current hierarchy are identified (thus obtaining a list of cells), the list of cells are ungrouped to dissolve the current hierarchy, one or more specified cells are removed from the list of cells, (where the specified one or more cells are to be moved to a different hierarchy), and the list of cells that excludes the specified one or more cells is re-grouped, to re-form the previously dissolved hierarchy without the specified one or more cells. A push phase during hierarchical repartitioning may include multiple push operations, during which all cells within the next lower-level hierarchy are identified, the identified list of cells are ungrouped to dissolve that hierarchy, the specified one or more cells are added to the identified list of cells, and the new list of cells that includes the specified one or more cells is grouped to reform the previously dissolved hierarchy. This allows for rapid prototyping, which reduces pin count and/or area, faster physical design iterations, and faster merging of new RTL code drops.

BRIEF DESCRIPTION OF THE DRAWINGS

FIG. 6 is a block diagram depicting the exemplary hierarchical circuit block of FIG. 2 with a new second level of hierarchical grouping that excludes the selected cell.

FIG. 7 is a block diagram depicting the exemplary hierarchical circuit block of FIG. 2 with a third level of hierarchical grouping removed from a group of cells that don't include the selected cell.

FIG. 8 is a block diagram the exemplary hierarchical circuit block of FIG. 2 with a new third level of hierarchical grouping that includes the selected cell.

FIG. 10a and FIG. 10b provide an example script for one embodiment of a method for rearranging a hierarchical design without rewriting the RTL code.

Figure 1:
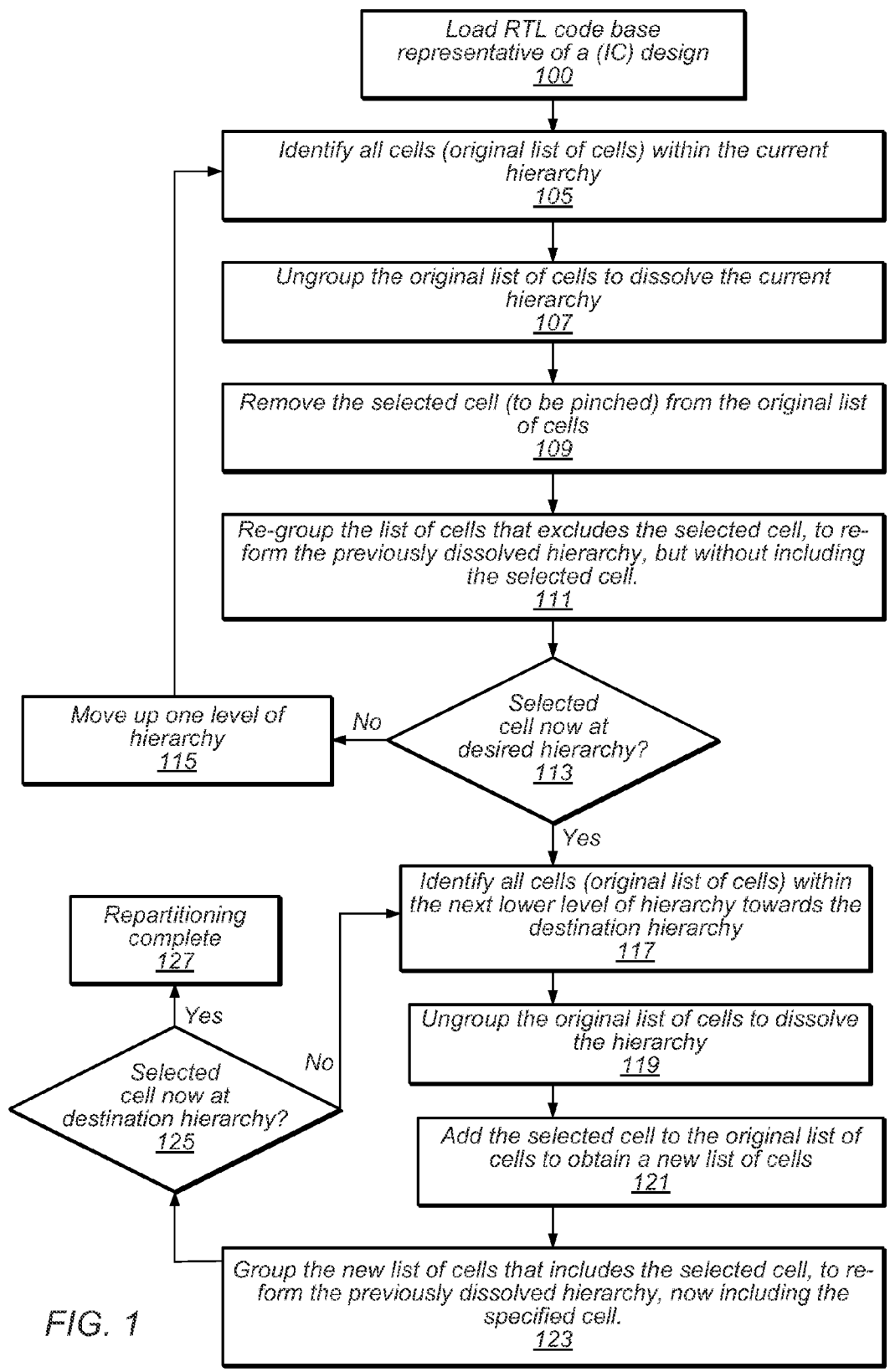
FIG. 1 is a flow diagram depicting an operational flow for manipulating and moving selected cells from one level of hierarchy to another level of hierarchy within a design.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

FIG. 1 shows a flow diagram depicting an operational flow for manipulating and repartitioning/rearranging cells (i.e., preexisting logic or circuit blocks) in an integrated circuit design. As previously mentioned, a design in RTL (Register Transfer Language) format (or other hardware description language format) may be provided by one designer, group, or vendor, and may be used as part of a larger circuit design. When a design is delivered as register transfer level (RTL) code base representing the integrated circuit (IC), modifications to the design may be made prior to synthesizing the design to obtain a logic netlist and/or physical representation of the IC, which may then provide the basis for layout and fabrication. The RTL representation may be written in a hardware description language (HDL) such as Verilog or VHDL, for example.

In many cases the RTL code base may include a circuit hierarchy in which one or more preexisting logic blocks or cells reside at different hierarchical levels. The various groupings of cells may represent different levels of hierarchy at which the respective groups of cells reside. In some cases, this hierarchical partitioning of the RTL code base may not be ideal for physical implementation, and the RTL design hierarchy may have to be manipulated to obtain different, more desirable physical partitioning. In one set of embodiments, a design tool may be operated to selectively dissolve respective levels of hierarchy and create respective new levels of hierarchy for selected cells, to generate a new design hierarchy that may produce more desirable physical partitioning during synthesis of the RTL code base.

Accordingly, referring to FIG. 1, starting at 100, the HDL representation, for example an RTL code base of an integrated circuit design is loaded into a design tool such as a synthesis and/or compiler tool (one example being the synthesis tool provided by Synopsys). The hierarchical structure of the RTL code base may be rearranged according to two principal phases of operation: a pop phase and a push phase. In the pop phase, a selected cell may be moved up one or more levels of hierarchy within nested levels of hierarchy until the cell is brought to a desired level of hierarchy. In the push phase, the selected cell may be moved down one or more levels of hierarchy within nested levels of hierarchy, which may be different from or parallel to nested levels of hierarchy from where the selected cell was moved up, until the cell is brought to the desired level of hierarchy, and is part of a desired group of cells residing at a same level of hierarchy. This process may be performed for one or more selected cells, and may involve traversing multiple parallel nested hierarchies as will be further described below with reference to FIGS. 2-8.

During the pop phase, all cells within a current hierarchy (i.e. within a current level of hierarchy) may be identified (105). This group of cells may be considered the original list of cells that reside at the current hierarchy. There may be one or more cells from the original list that are intended to be moved to different level(s) of hierarchy for various reasons, for example to ultimately obtain a more desirable or better physical partitioning. In the embodiments discussed herein, only a single cell is selected for ease of illustration, and it should be understood that more than one cell may be selected and the selection may be made at any level of hierarchy during the process, as part of the overall hierarchical rearrangement. In other words, at any stage where a cell is selected to be moved to a different level of hierarchy, more than one cell may be selected, and the selected cell(s) may be moved as far up and/or down one or more levels of hierarchy as required.

Once the original list of cells has been identified, the original list of cells may be ungrouped to dissolve the current hierarchy (107). The selected cell to be moved to a different hierarchy is removed from the original list of cells, (also expressed herein as the cell being "pinched" from the original list) (109). Once the selected cell has been pinched from the original list of cells, the list of cells that excludes the selected cell may be re-grouped, to re-form the previously dissolved hierarchy but without the specified cell. This effectively moves the list of cells up one level of hierarchy. At this point, the selected cell may reside in a desired hierarchy. That is, the selected cell may reside at a desired level of hierarchy, and the repartitioning may enter the push phase ('Yes' branch of 113). However, if the selected cell is not at the desired hierarchy ('No' branch of 113), the process may move up one level of hierarchy, and perform 105-113 for that level of hierarchy.

As will be further explained below, the desired level of hierarchy in this case may be representative of a common level of hierarchy situated between the source hierarchy (originally containing the selected cell(s)) and the destination hierarchy where the selected cell(s) are to be moved. The common level of hierarchy represents a hierarchy where the selected cell(s) may be grouped with other cell(s) as intended, and from where the selected cell(s) may eventually be moved to the destination hierarchy, as will also be further discussed below. As mentioned above, once the selected cell resides at a desired level of hierarchy, the repartitioning may enter the push phase ('Yes' branch of 113). The desired level of hierarchy at this point may represent a hierarchy from which the selected cell may be pushed to the intended final hierarchy. Thus, once the selected (pinched) cell is at the desired hierarchy, all cells within the next lower level hierarchy may be identified, thus obtaining an original list of cells (117). The identified original list of cells may then be ungrouped to dissolve that hierarchy (119), thereby brining the original list of cells to the same hierarchy as the selected cell. The selected cell may then be added to the original list of cells to obtain a new list of cells (121). The new list of cells that includes the selected cell may be grouped to re-form the previously dissolved hierarchy, which now includes the specified cell (123). At this point, the selected cell may be in the destination hierarchy, that is, at the level of hierarchy where the selected cell was to be moved ('Yes' branch of 125). In this case, the repartitioning process is completed (127). However, if the selected cell is not at the desired level of hierarchy ('No' branch of 125), the process may move perform 117-125.

The respective (level of) hierarchy around all cells (within the respective hierarchy) may be dissolved by using an ungroup command, for example, in the design tool, to bring all those cells up one level of hierarchy. The intention may be to group the selected cell with other cell or cells that reside at a different hierarchy, and the selected cell may be moved up and/or down various levels of hierarchy to accomplish this goal. Once the selected cell and the other cell(s) with which the selected cell is to be grouped reside at a same level of hierarchy, the selected cell and the other cell(s) may be grouped to form a desired hierarchy. To further illustrate the embodiment of the repartitioning method shown in FIG. 1, we now turn to FIG. 2.

Figure 2:
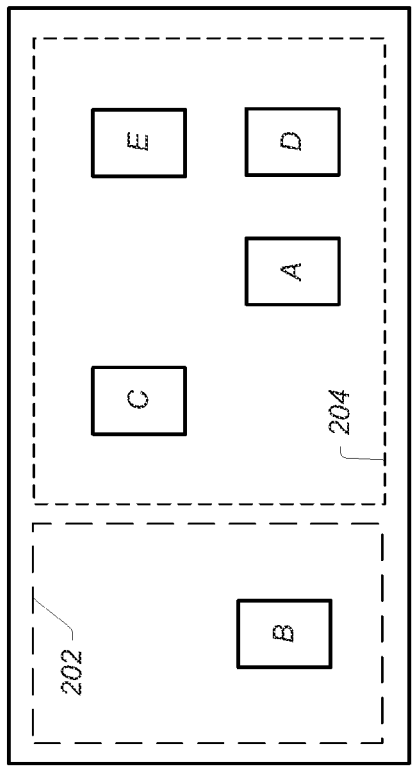
FIG. 2 is a block diagram of an exemplary hierarchical circuit block depicting the position of different cells within different levels of hierarchy.

FIG. 2 shows a block diagram of an exemplary hierarchical circuit block 200 depicting the position of different cells within different levels of hierarchy. Circuit block 200 may represent an integrated circuit, for example, which may exist as an RTL code base that is also representative of the same integrated circuit. As seen in FIG. 2, the hierarchies may be nested. That is a hierarchy itself may include one or more lower level hierarchies, as exemplified by hierarchy 204, which includes cells (circuit/logic blocks) A, C, D, and E, where cells A, D, and E may also be part of another level of hierarchy 206, nested within hierarchy 204. Numerous hierarchies may also exist at a same level of hierarchy, as exemplified by hierarchies 202 and 204, which, in this case, exist at the block level, that is, at the top-level hierarchy that represents circuit block 200.

Figure 9:
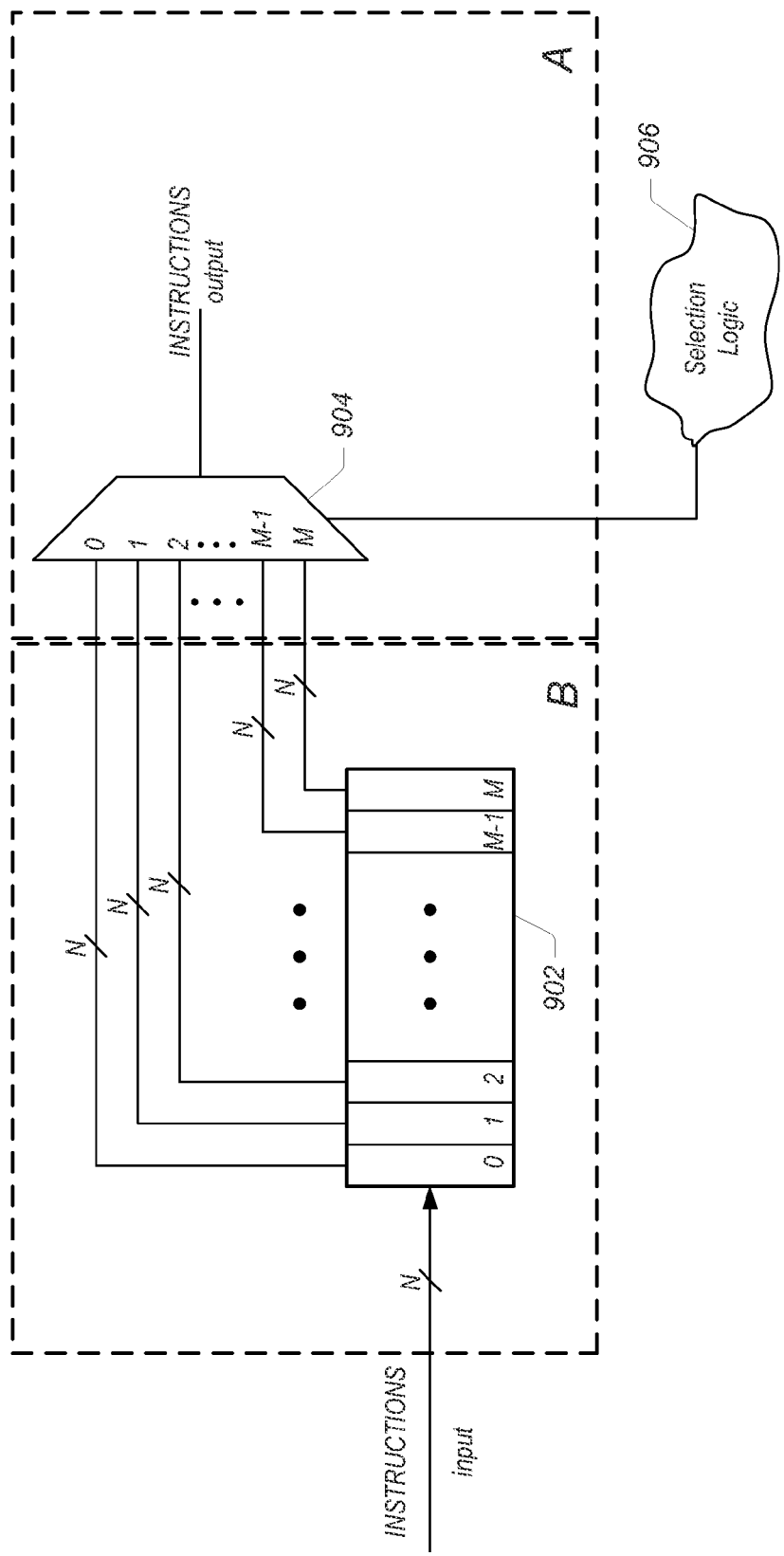
FIG. 9 is a block diagram showing examples of respective circuits contained in cells A and B of the exemplary hierarchical circuit block of FIG. 2.

In some cases, the hierarchical partitioning represented in FIG. 2 may not be the most desired partitioning for circuit block 200. For example, a physical implementation of circuit block 200 obtained by synthesizing circuit block 200 may not be partitioned in an ideal fashion. As an illustration, consider FIG. 9, which is a block diagram showing examples of respective circuits that may represent cells A and B of the exemplary hierarchical circuit block 200 of FIG. 2. In the example shown in FIG. 9, cell A is a multiplexer 904, which may be coupled to selection logic 906 (which may be one of the other cells also residing at hierarchy 206, or it may be a cell or group of cells that reside at some other level of hierarchy). Cell B is a queue 902, which may receive instructions or some other data to be stored in the queue 902. The input into queue 902 may include N data lines, for example 96 lines for 96-bit data. The queue 902 may have M entries, for example 12 entries, which may each output the N bits of data.

The system, as also represented in the corresponding RTL code base, may have the outputs of queue 902 coupled to the M-to-1 multiplexer 904, to provide a selection of any one of the stored entries according to selection logic 906. However, as partitioned in FIG. 2, because queue 902 (i.e. cell B) is at a different hierarchy than multiplexer 904 (i.e. cell A), queue 902 and multiplexer 904 may be geographically far apart in the physical implementation—obtained through synthesis, for example—of circuit block 200. For example, if M=12 and N=96, a total of 1152 wires are crossing the boundary of hierarchy 202, routed to hierarchy 206 to reach the inputs of multiplexer 904. Routing 1152 wires across block and hierarchy boundaries may result in spreading out physical pins and lead to a considerable wiring congestion problem. A solution to avoid this problem is to move queue 906 and multiplexer 904 to the same level of hierarchy. Doing so may considerably shorten the wires, and result in a better physical implementation of circuit block 200 obtained through synthesis of circuit block 200. As shown in the flow diagram of FIG. 1, this move of the selected cell (in this case cell A, i.e. multiplexer 906) may be performed without changing the pins and names of wires and other components, merely changing the place of cell A within the overall level of hierarchy.

Figure 3:
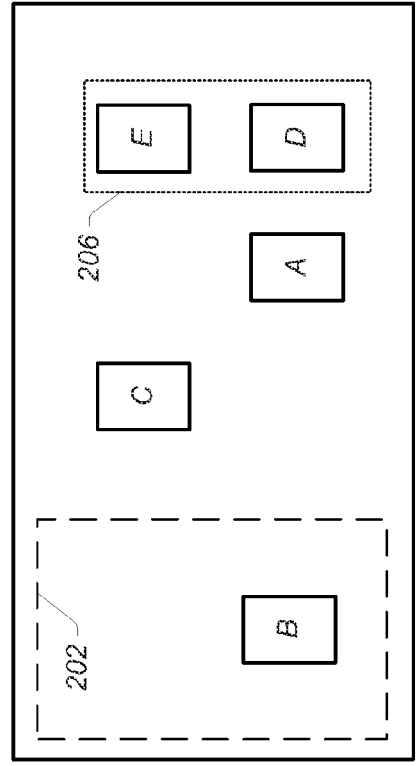
FIG. 3 is a block diagram depicting the exemplary hierarchical circuit block of FIG. 2 with a first level of hierarchical grouping removed from a group of cells containing a selected cell.
Figure 4:
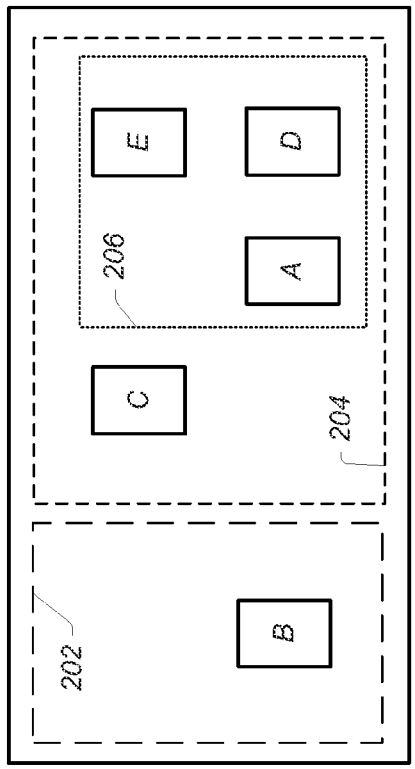
FIG. 4 is a block diagram depicting the exemplary hierarchical circuit block of FIG. 2 with a new first level of hierarchical grouping that excludes the selected cell.

Thus, cell A may be targeted as the cell to move to the same hierarchy (202) where cell B resides. FIG. 3 is a block diagram showing circuit block 200 with hierarchy 206 dissolved. As indicated in 105 of the flow diagram of FIG. 1, cells A, D, and E are identified as the original cells within hierarchy 206. Cells A, D, and E are then ungrouped to dissolve hierarchy 206. However, all three cells (A, D, and E) have been identified as belonging to hierarchy 206. Thus, once hierarchy 206 has been dissolved (as indicated in 107 of FIG. 1, for example), cell A can be removed from the list of cells that includes A, D, and E, leaving only cells D and E (as indicated in 109 of FIG. 1, for example). Cells D and E are then re-grouped to reform hierarchy 206, (as indicated in 111 of FIG. 1, for example, and shown in FIG. 4, which is a block diagram showing circuit block 200 with hierarchy 206 now excluding cell A. In one sense, cell A has been "popped up" one level of hierarchy.

Since the goal is to move cell A to hierarchy 202, the popping phase is not yet complete because cell A still resides within hierarchy 204, within which hierarchy 206 is nested, and which is a lateral to hierarchy 202. Thus, because cell A does not yet reside at the desired level of hierarchy (which in this case represents the lowest level of hierarchy where cell A and cell B can be brought to a same hierarchy, i.e. one level above hierarchy 204), the pop process moves up one level of hierarchy, in this case hierarchy 204, which is the hierarchy at which cell A now resides (as indicated in 113 and 115 of FIG. 1, for example). In further reference to the flow diagram of FIG. 1, the process is therefore again at stage 105.

Figure 5:
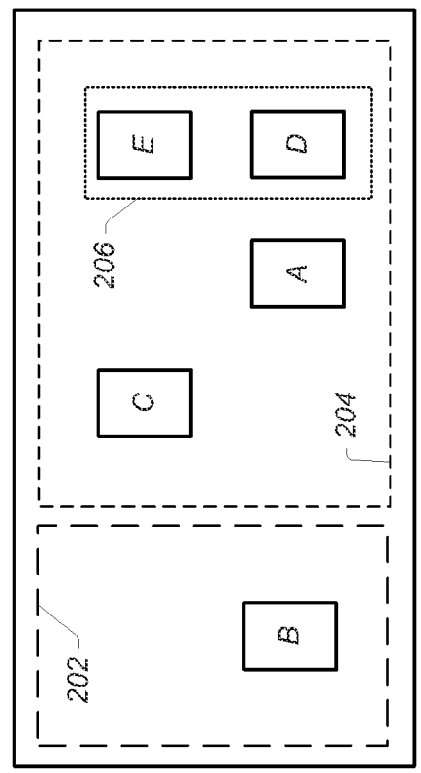
FIG. 5 is a block diagram depicting the exemplary hierarchical circuit block of FIG. 2 with a second level of hierarchical grouping removed from a group of cells containing the selected cell.

Accordingly, FIG. 5 shows a block diagram in which hierarchy 204 within circuit block 200 has been dissolved. As indicated in 105 of the flow diagram of FIG. 1, cells A and C are identified as the original cells within hierarchy 204. Since cells D and E reside at hierarchy 206 nested within hierarchy 204, those cells do not need to be individually tracked at this point, as hierarchy 206 has been previously restored and is understood to be a part of hierarchy 204, as the hierarchical structure itself is not modified. Cells A and C and hierarchy 206 are then ungrouped to dissolve hierarchy 204. However, both A and C and hierarchy 206 have been identified as belonging to hierarchy 204. Thus, once hierarchy 204 has been dissolved (as again, indicated in 107 of FIG. 1, for example), cell A can be removed from the list of cells that includes A and C, leaving only cell C and hierarchy 206 (as indicated in 109 of FIG. 1, for example). Cell C and hierarchy 206 are then re-grouped to reform hierarchy 204, (as indicated in 111 of FIG. 1, for example), shown in FIG. 6, which is a block diagram showing circuit block 200 with hierarchy 204 now excluding cell A. Again, in one sense, cell A has been "popped up" one level of hierarchy.

Because the goal is to move cell A to hierarchy 202, the popping phase is now complete as cell A now resides one level of hierarchy above hierarchy 204, which is the highest level of hierarchy lateral to hierarchy 202. Thus, because cell A now resides at the desired level of hierarchy (which, again, represents the lowest level of hierarchy where cell A and cell B can be brought to a same hierarchy, i.e. one level above hierarchy 204), the process moves to the push phase (as indicated by 113 branching down, in FIG. 1, for example). In further reference to the flow diagram of FIG. 1, the process is therefore now at stage 117.

Accordingly, FIG. 7 shows a block diagram in which hierarchy 202 within circuit block 200 has been dissolved. As indicated in 117 of the flow diagram of FIG. 1, cell B is identified as the original cell within hierarchy 202, which is the next lower level of hierarchy towards the destination hierarchy, which in this case happens to be hierarchy 202 itself. Cell B is then ungrouped to dissolve hierarchy 202 (as indicated in 119 of FIG. 1, for example). Once hierarchy 202 has been dissolved, cell A and cell B are now within the same hierarchy. That hierarchy, however, is not the hierarchy, in which cell B originally resided, which is hierarchy 202. Cell A may be added to the list of cells that includes cell B (as indicated in 121 of FIG. 1, for example). Cell B and cell A are then grouped to reform hierarchy 202, (as indicated in 123 of FIG. 1, for example), shown in FIG. 8, which is a block diagram showing circuit block 200 with hierarchy 202 now including cell A. Thus, in one sense, cell A has been "pushed down" one level of hierarchy.

Thus, cell A has been successfully moved from hierarchy 206 to hierarchy 202, without any of the RTL code base having been re-written from a functional/logical perspective. The hierarchical partitioning shown in FIG. 8 may provide a better positioning of cell A, for example when considering the embodiment shown in FIG. 9, where cell A is multiplexer 904, and cell B is queue 902. Since multiplexer 904 and queue 902 are now at the same hierarchy, the output lines from queue 902 no longer have to cross hierarchical boundaries, and a more practical physical implementation may be synthesized from circuit block 200, resulting in much reduced wiring congestion and other routing related problems.

It should be noted that one or more of the steps performed in the flow diagram of FIG. 1, may be performed using script files that execute either as a stand alone design tool or as part of and within a synthesis tool. More particularly, when a script is used as part of an existing synthesis design tool, the commands such as "ungroup" and "group" may be different depending on the specific design tool. Furthermore, while ungrouping is shown to be performed first during the pop phase (107) prior to the selected cell being removed from the original cell list (109), in some embodiments the selected cell may be removed from the list of cells before the hierarchy around the cells is dissolved, and the previously dissolved hierarchy may then be re-formed as indicated in 111. Similarly, while ungrouping is shown to be performed first during the push phase (119) prior to the selected cell being added to the original cell list (121), in some embodiments the selected cell may be added to the list of cells before the hierarchy around the cells is dissolved, and the previously dissolved hierarchy may then be re-formed as indicated in 123.

FIG. 10a and FIG. 10b provide an example script for one embodiment of a method for rearranging a hierarchical design without rewriting the RTL code. In the example script, a start instance and a destination may be set, and the paths between the cells that now reside in different hierarchies, and are to be grouped, is compared to determine the number of levels of hierarchies that need to be traversed upward the hierarchies and downward the hierarchies. A number of common levels of hierarchy from the relative top-level hierarchy (from where the selected cell may be pushed) between the two paths may also be determined. Once iteration variables have been determined, the block (cell) may be moved up the hierarchy (the Pop routine is the top half of FIG. 10b). Subsequently, the block (cell) may be pushed down to the destination hierarchy (the Push routine is the bottom half of FIG. 10b). The script shown in FIGS. 10a and 10b is provided as an example, and other scripts/programs/code may be written to equally implement various embodiments of the repartitioning process described above.

Figure 11:
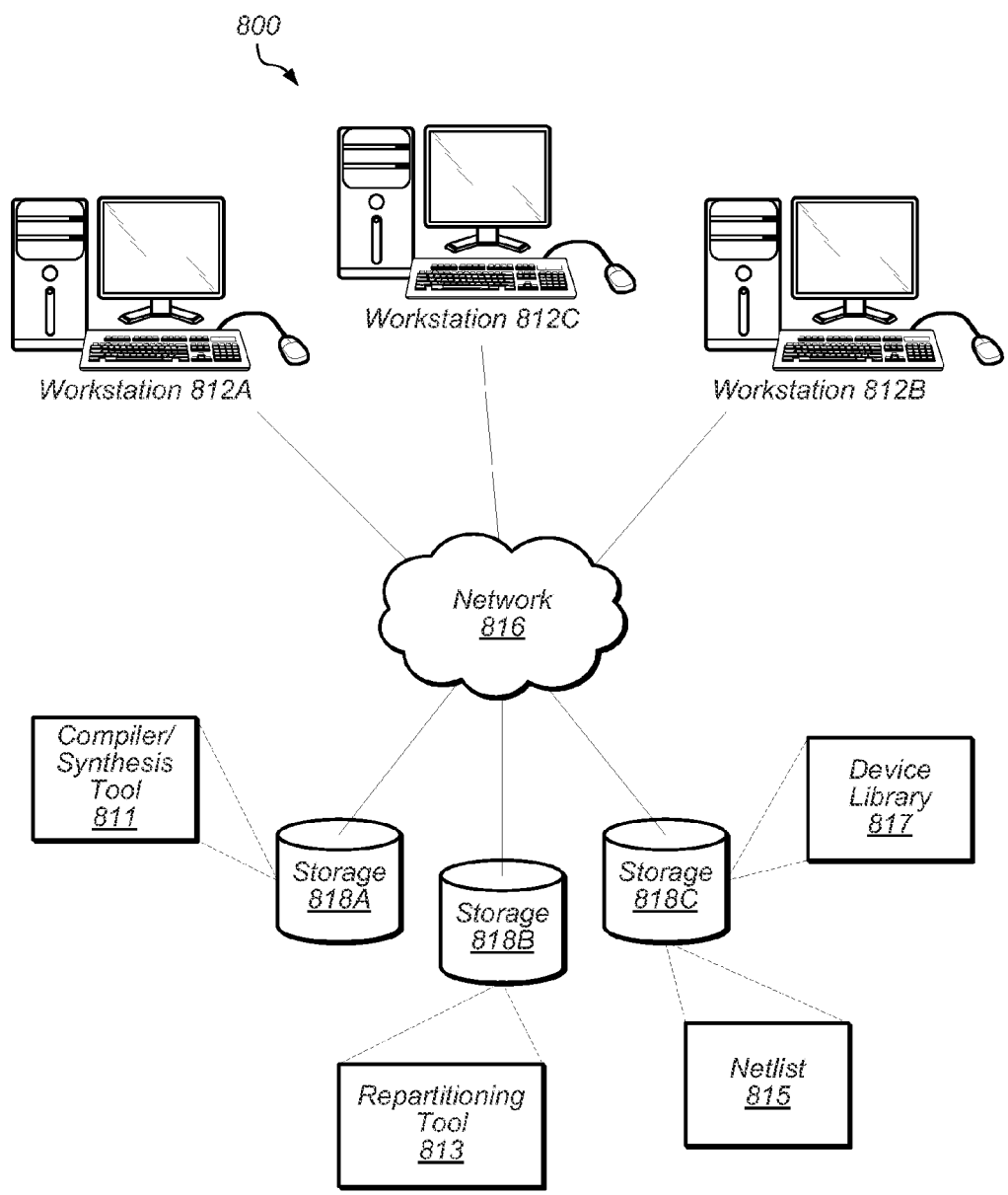
FIG. 11 is a block diagram of one embodiment of a computer system used to implement a design tool.

FIG. 11 shows a block diagram of one embodiment of a computer system used to implement a design tool for manipulating and repartitioning a hierarchical integrated circuit design. The computer system 800 includes a plurality of workstations designated 812A through 812C. The workstations are coupled together through a network 816 and to a plurality of storages designated 818A through 818C. In one embodiment, each of workstations 812A-812C may be representative of any standalone computing platform that may include, for example, one or more processors, local system memory including any type of random access memory (RAM) device, monitor, input output (I/O) means such as a network connection, mouse, keyboard, monitor, and the like (many of which are not shown for simplicity).

In one embodiment, storages 818A-818C may be representative of any type of mass storage device such as hard disk systems, optical media drives, tape drives, ram disk storage, and the like. As such, the program instructions comprising the design tools may be stored within any of storages 818A-818C and loaded into the local system memory of any of the workstations during execution. As an example, as shown in FIG. 8, the compiler/synthesis tool 811 is stored within storage 818A, while the repartitioning tool (e.g. when the repartitioning tool is a standalone script(s), such as the script shown in FIGS. 10a and 10b, and or program suite) 813 is shown stored within storage 818B, and the netlist 815 and the device library 817 are stored within storage 818C. Additionally, the program instructions may be stored on a portable/removable storage media. The program instructions may be executed directly from the removable media or transferred to the local system memory or mass storages 818 for subsequent execution. As such, the portable storage media, the local system memory, and the mass storages may be referred to as non-transitory computer readable storage mediums. The program instructions may be executed by the one or more processors on a given workstation, or they may be executed in a distributed fashion among the workstations, as desired.

It is noted that although the computer system shown in FIG. 8 is a networked computer system, it is contemplated that in other embodiments, each workstation may also include local mass storage. In such embodiments, the program instructions and the results of the design tools may be stored locally. Furthermore, it is contemplated that the program instructions may be executed on a standalone computer such as a personal computer that includes local mass storage and a system memory. Generally, the program instructions may be executed on any platform and/or hardware configuration conducive to storing and manipulating data and programming instructions. In some embodiments, application specific hardware modules may also be designed if desired, to implement any or all of the elements of the processes described herein, for which such implementation is possible.

Various embodiments described above provide examples of a method for manipulating a circuit design having a given hierarchy, and moving cells (circuit/logic blocks) from one hierarchy to another hierarchy, without functionally and/or logically rewriting the RTL code base representing the circuit design. The method includes popping selected cells up to a specified desired level of hierarchy, and pushing the selected cells down to a destination hierarchy where the selected cells are meant to be grouped with other specified cells.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method comprising:
performing, by one or more computers each comprising at least a processor and a memory:
receiving a hardware description language (HDL) representation of a circuit block of an integrated circuit (IC), wherein the circuit block comprises a plurality of cells disposed at different hierarchies;
performing a pop phase until a selected cell is at a desired hierarchy, wherein performing the pop phase comprises:
identifying a first list of cells that includes all cells within a current hierarchy that includes the selected cell;
dissolving the current hierarchy;
removing the selected cell from the first list of cells to obtain a new first list of cells;
re-forming the previously dissolved current hierarchy with the new first list of cells, to pop the selected cell to a next higher level of hierarchy; and
moving to the next higher level of hierarchy;
once the selected cell is at the desired hierarchy, performing a push phase until the selected cell is at a destination hierarchy, wherein performing the push phase comprises:
identifying a second list of cells within a next lower level of hierarchy;
dissolving the next lower level of hierarchy;
adding the selected cell to the second list of cells to obtain a new second list of cells; and
re-forming the previously dissolved next lower level of hierarchy with the new second list of cells, to push the selected cell to the next lower level of hierarchy.

2. The method of claim 1;
wherein dissolving the current hierarchy comprises ungrouping the first list of cells; and
wherein dissolving the next lower level of hierarchy comprises ungrouping the second list of cells.

3. The method of claim 1;
wherein re-forming the previously dissolved current hierarchy comprises grouping the new first list of cells; and
wherein re-forming the previously dissolved next lower level of hierarchy comprises grouping the new second list of cells.

4. The method of claim 1, further comprising specifying the destination hierarchy based on a connectivity of the selected cell within the circuit block.

5. The method of claim 1, further comprising specifying the selected cell based on a connectivity of the selected cell within the circuit block.

6. The method of claim 1, further comprising synthesizing the circuit block to obtain a physical implementation of the circuit block.

7. The method of claim 6, further comprising specifying the destination hierarchy and the selected cell according to an expected physical implementation of the circuit block.

8. A method comprising:
performing, by one or more computers each comprising at least a processor and a memory:
receiving a hardware description language (HDL) representation of a circuit block of an integrated circuit (IC), wherein the circuit block comprises a plurality of cells disposed at different hierarchies;
selecting one or more cells within the circuit block;
for each respective cell of the selected one or more cells, performing a pop phase until the respective cell is at a respective desired hierarchy, wherein performing the pop phase comprises:
identifying a first list of cells that includes all cells within a respective current hierarchy that includes the respective cell;
dissolving the respective current hierarchy;
removing the respective cell from the first list of cells to obtain a new first list of cells;
re-forming the previously dissolved respective current hierarchy with the new first list of cells, to pop the respective cell to a respective next higher level of hierarchy; and
moving to the respective next higher level of hierarchy;
once the respective cell is at the respective desired hierarchy, performing a push phase until the respective cell is at a respective destination hierarchy, wherein performing the push phase comprises:
identifying a second list of cells within a respective next lower level of hierarchy;
dissolving the respective next lower level of hierarchy;
adding the selected cell to the second list of cells to obtain a new second list of cells; and re-forming the previously dissolved respective next lower level of hierarchy with the new second list of cells, to push the selected cell to the respective next lower level of hierarchy.

9. The method of claim 8, wherein the respective desired hierarchy represents a lowest possible level of hierarchy from which the respective cell can be successively pushed to respective lower levels of hierarchy until the respective cell is at its respective destination hierarchy.

10. The method of claim 8, further comprising specifying the respective destination hierarchy for the respective cell based on a position of the respective cell within the different hierarchies of the circuit block.

11. The method of claim 8, further comprising specifying the respective destination hierarchy for the respective cell based on a number of levels of hierarchy between the respective cell and one or more cells coupled to the respective cell within the circuit block, wherein the respective cell and the one or more cells are at different levels of hierarchy.

12. The method of claim 8, wherein the different hierarchies comprise a plurality of lateral nested hierarchies.

13. A system comprising:
one or more processing units configured to execute programming instructions; and
one or more memory elements configured to store programming instructions executable by the one or more processing units to:
in a hardware description language (HDL) representation of a circuit block of an integrated circuit (IC), the circuit block comprising a plurality of cells located at different levels of hierarchy:
perform a pop phase until a selected cell is at a desired hierarchy, wherein to perform the pop phase, the programming instructions are further executable to:
identify all cells within a current hierarchy that includes the selected cell;
ungroup the identified cells of the current hierarchy, to temporarily move the identified cells of the current hierarchy up one level of hierarchy from the current hierarchy;
group the identified cells of the current hierarchy excepting the selected cell to re-form the current hierarchy without the selected cell; and
move up one level of hierarchy from the current hierarchy;
once the selected cell is at the desired hierarchy, perform a push phase until the selected cell is at a destination hierarchy, wherein to perform the push phase, the programming instructions are further executable to:
identify all cells within a next lower level of hierarchy;
add the selected cell to identified cells of the next lower level of hierarchy;
ungroup the identified cells of the next lower level of hierarchy, to temporarily move the identified cells of the next lower level of hierarchy up one level of hierarchy from the next lower level of hierarchy; and
group the selected cell and the identified cells of the next lower level of hierarchy to re-form the next lower level of hierarchy including the selected cell.

14. The system of claim 13, wherein the one or more memory elements are further configured to store programming instructions executable by the one or more processing units to:
specify the selected cell based on a relative position of the selected cell with respect to other specified cells within the circuit block.

15. The system of claim 13, wherein the one or more memory elements are further configured to store programming instructions executable by the one or more processing units to:
determine how many common levels of hierarchy exist between a first path established from a first hierarchy, where the selected cell is originally located, to the desired hierarchy, and a second path established from the desired hierarchy to the destination hierarchy.

16. The system of claim 13, wherein the one or more memory elements are further configured to store programming instructions executable by the one or more processing units to:
determine how many levels of hierarchy the selected cell needs to be moved up from a first hierarchy where the selected cell is originally located, before the selected cell is at the desired hierarchy.

17. The system of claim 15, wherein the one or more memory elements are further configured to store programming instructions executable by the one or more processing units to:
determine how many levels of hierarchy the selected cell needs to be moved down from the desired hierarchy, before the selected cell is at the destination hierarchy.

18. A non-transitory computer readable memory medium configured to store programming instructions executable to:
receive a hardware description language (HDL) representation of a circuit block of an integrated circuit (IC), wherein the circuit block comprises a plurality of cells located at different levels of hierarchy:
perform a pop phase until a selected cell is at a desired hierarchy, wherein to perform the pop phase, the programming instructions are further executable to:
identify a first list comprising all cells within a current hierarchy that includes the selected cell;
ungroup all cells comprised in the first list to remove the current hierarchy from around all cells comprised in the first list;
remove the selected cell from the first list;
group all remaining cells comprised in the first list to re-form the current hierarchy without the selected cell; and
move up one level of hierarchy from the current hierarchy;
once the selected cell is at the desired hierarchy, perform a push phase until the selected cell is at a destination hierarchy, wherein to perform the push phase, the programming instructions are further executable to:
identify a second list comprising all cells within a next lower level of hierarchy;
ungroup all cells comprised in the second list to remove the next lower level of hierarchy from around all cells comprised in the second list;
add the selected cell to the second list; and
group all cells comprised in the second list to re-form the next lower level of hierarchy including the selected cell.

19. The computer readable memory medium of claim 18, further configured to store programming instructions executable to:
specify the selected cell and the destination hierarchy based on relative hierarchical positions of the selected cell and one or more other cells of the plurality of cells to which the selected cell is coupled.

20. The computer readable memory medium of claim 18, further configured to store programming instructions executable to:

determine the desired hierarchy based on a number of levels of hierarchy that the selected cell has to be moved up from its original hierarchy before the selected cell can be pushed down toward the destination hierarchy.

\* \* \* \* \*